United States Patent
Godkar et al.

(10) Patent No.: US 12,515,514 B1
(45) Date of Patent: Jan. 6, 2026

(54) HYBRID ELECTRIC DRIVE SYSTEM FOR A VEHICLE

(71) Applicant: NEXTGEN TECH INITIATIVES PVT LTD, Maharashtra (IN)

(72) Inventors: Rohit Arvind Godkar, Maharashtra (IN); Mehul Satish Nachane, Maharashtra (IN); Sharad Rajaram Godkar, Maharashtra (IN)

(73) Assignee: NEXTGEN TECH INITIATIVES PVT LTD, Maharashtra (IN)

(*) Notice: Subject to any disclaimer, the term of this patent is extended or adjusted under 35 U.S.C. 154(b) by 0 days.

(21) Appl. No.: 19/049,541

(22) Filed: Feb. 10, 2025

(30) Foreign Application Priority Data

Dec. 14, 2024 (IN) .............. 202421099106

(51) Int. Cl.
*B60K 6/365* (2007.10)
*B60K 6/52* (2007.10)

(52) U.S. Cl.
CPC .............. *B60K 6/52* (2013.01); *B60K 6/365* (2013.01)

(58) Field of Classification Search
CPC .................. B60K 6/52; B60K 6/365
See application file for complete search history.

(56) References Cited

U.S. PATENT DOCUMENTS

| | | | |
|---|---|---|---|
| 2,810,293 A | 10/1957 | George et al. | |
| 9,758,146 B2 | 9/2017 | Diehl et al. | |
| 12,077,048 B2 | 9/2024 | Godkar et al. | |
| 2003/0078134 A1 | 4/2003 | Kojima et al. | |
| 2004/0050597 A1 | 3/2004 | Ai et al. | |
| 2010/0048338 A1 | 2/2010 | Si | |
| 2019/0383373 A1* | 12/2019 | Engerman | F16H 37/082 |
| 2020/0114757 A1 | 4/2020 | Gasparovic et al. | |
| 2023/0173908 A1* | 6/2023 | Godkar | B60K 6/365 475/5 |
| 2024/0183436 A1 | 6/2024 | Wijntjes et al. | |

FOREIGN PATENT DOCUMENTS

| | | | |
|---|---|---|---|
| CN | 1413855 A | 4/2003 | |
| CN | 101445043 A | 6/2009 | |
| CN | 101585314 A | 11/2009 | |
| CN | 102774265 A | 11/2012 | |
| CN | 113525060 A | 10/2021 | |
| NL | 2027910 B1 | 10/2022 | |
| TW | 201736160 A | 10/2017 | |
| WO | 03035422 A1 | 5/2003 | |
| WO | WO-2023067539 A1 * | 4/2023 | B60K 6/365 |

* cited by examiner

Primary Examiner — Tisha D Lewis
(74) Attorney, Agent, or Firm — McDonald Hopkins LLC

(57) ABSTRACT

A retro-fittable hybrid electric drive system comprises an electric motor and an epicyclic gear system and mode controller, and is configured between IC power pack and an axle to allow different modes of operations, comprising an IC engine mode, an electric mode, a combined mode and a generative mode. The epicyclic gear system and mode controller comprises an epicyclic gear train and levers & pinions to lock or unlock different elements of the epicyclic gear train to achieve the different modes of operations, including two different forward torque-speed ratios during the electric mode.

16 Claims, 11 Drawing Sheets

HYBRID ELECTRIC DRIVE SYSTEM FOR A VEHICLE

FIELD OF THE INVENTION

Present invention relates to the field of automobiles. In particular, the present disclosure pertains to an alternative powertrain technology that optimises integration of two independent drives such as ICE and Electric powertrains, on a vehicle.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

One of the greatest challenges being faced by human race today is undoubtedly the climate change and its potentially catastrophic consequences for humanity. The ever rising greenhouse gas emissions coupled with massive urbanisation trends create a further challenge where large scale migration to urban areas is creating several high density population clusters that require tremendous resources for survival such as round the clock availability of utilities, products and services to support such urban lifestyle. As a consequence, one of the highest contributors to global greenhouse gas emissions is transportation sector, responsible for nearly quarter of greenhouse gas emissions every year. The urban vehicular emissions not only affect the global temperature rise and the climate, but also the health of the urban populations as they inhale those harmful vehicular emissions that create health hazards including early deaths and COPD (chronic obstructive pulmonary disorders).

There has been a strong scientific evidence and record of such health hazards and ailments which need to be addressed with the sense of urgency, by providing more workable solutions for sustainable mobility which reduces the quantum of harmful emissions. At the same time, the consumers of automobile sector are used to certain conveniences with respect to ease of fueling, long range on a full fuel tank, as well as certain driving features which can't be taken away from them in an instant by switching to non-IC engine vehicles such as fully electric vehicles, which are short on features and conveniences keeping in mind the mass affordability factor. The fully electric vehicles have several shortcomings such as long recharge times, inconvenience of not having adequate charging facilities, range anxiety for drivers and passengers as a result of relatively short range on a single charge, etc.

Therefore, there is a need to first migrate to an intermittent stage of hybrid electric mobility solution such as a Plug-in Hybrid Electric Vehicle (PHEV) and/or Fuel Cell Electric Hybrid Vehicle (FC-HEV) whereby all shortcomings of a full electric vehicle or an ICE vehicle, can be effectively addressed.

OBJECTS OF THE DISCLOSURE

Some of the objects of the present disclosure, which at least one embodiment herein satisfies are as listed herein below.

It is an object of the present invention to provide a more sustainable transport solution.

It is another object of the present invention to provide a hybrid electric drive that can be retrofitted to convert an existing vehicle powered by an IC engine based power pack to a hybrid vehicle.

It is another object of the present invention to provide a hybrid electric drive that can be fitted to vehicle powered by an IC power pack in the manufacturer's assembly line.

It is another object of the present invention to provide a hybrid electric drive that can be fitted on any of a front wheel drive vehicle, rear wheel drive vehicle and an all-wheel drive vehicle.

It is another object of the present invention to provide a vehicle by using a hybrid electric drive system that allows a user defined mode selection to enable the user to control the mode of operation of the vehicle in specifically mandated zero vehicular pollution zones in urban areas.

It is another object of the present invention to provide a hybrid electric drive that allows multiple gear ratios and thereby allowing multiple torque-speed characteristics from the electric drive as well.

It is another object of the present invention to have a modular hybrid-electric-transaxle-drive unit wherein the hybrid electric drive system can be located as a single module within the transaxle unit between the IC engine gearbox and the front axle differential.

It is another object of the present invention to have an AI (Artificial Intelligence) based control system for the vehicle that can on the basis of the road conditions, traffic conditions, vehicular emission restrictions and route selected by the driver, select the various driving modes (Electric Mode, IC engine mode or combined mode) and their combinations in order to propel the vehicle by using the best efficiency operating zones of either of the powertrains.

It is another object of the present invention to allow the option of power take-off (PTO) to be provided from the electric powertrain of a hybrid electric vehicle.

SUMMARY

Present invention relates to hybrid electric drive system that optimises integration of two independent drives such as ICE and Electric powertrains, on a vehicle. More particularly, the present invention relates to a retro-fittable hybrid electric drive system that can be integrated with existing vehicles that operate on an internal combustion engine based power pack (IC power pack, herein) to enable hybrid operation of the vehicle that offer an optimum sustainable mobility solution. Specifically, the disclosed hybrid electric drive system can be retrofitted on front wheel drive vehicles, as well as on rear wheel drive vehicles or all-wheel drive vehicles.

In an aspect, the disclosed hybrid electric drive system includes an electric motor and an epicyclic gear system and mode controller. The hybrid electric drive system is fitted between an output of an IC power pack of the vehicle and an axle of the vehicle, and enables three different driving modes. The three driving modes include: drive to the axle from the primary power pack, drive to the axle from the electric motor, and drive to the axle collectively from the primary power pack and the electric motor.

In an aspect, the epicyclic gear system and mode controller allows output to be taken from a sun gear of epicyclic gear train of the epicyclic gear system and mode controller, and input to be given to at least one of planet carrier or a ring gear of the epicyclic gear train.

In an aspect, the power from both the IC power pack and the electric motor is transmitted to the sun gear such that the sun gear transmits the power to the axle.

In an aspect, the epicyclic gear system and mode controller allows output to be taken and input to be given to a combination of elements among that of the sun gear, planet carrier and ring gear of the epicyclic gear train.

In an aspect, the epicyclic gear system and the mode controller includes a first pinion gear that locks and unlocks planet carrier, and a third pinion gear that locks and unlocks the ring gear of the epicyclic gear train.

In an aspect, the first and the third pinion gears are respectively mounted on a first lever and a second lever that move to different positions to enable locking or unlocking of at least one of the planet carrier and the ring gear for enabling two different forward torque-speed ratios of the electric drive from the electric motor.

In an aspect, the epicyclic gear system and mode controller comprises a first series of pinion gears that transmit power from the electric motor to the planet carrier of the epicyclic gear train and a second series of pinion gears that transmit power from the electric motor to the ring gear of the epicyclic gear train, wherein the first and second levers move to the different positions to enable the three different driving modes.

In an aspect, for the electric mode or the IC power pack mode, the first and second levers are moved to a position such that the planet carrier of epicyclic gear train is unlocked, the electric motor power is transmitted to the planet carrier through a series of pinion gears of the epicyclic gear system and mode controller, and the ring gear is locked by pinion such that, the electric mode or IC power pack mode respectively is enabled.

In an aspect, for a second gear ratio in electric mode, the first and second levers are moved to a position such that the ring gear of the epicyclic gear train is unlocked, the planet carrier of the epicyclic gear train is locked by the first pinion, and power from the electric motor is transmitted to the ring gear through the second series of pinion gears of the epicyclic gear train. Similarly multiple gear ratios are possible in electric mode by using multiple epicyclic gear trains.

In an embodiment, the hybrid electric drive system may include a band brake system that locks and unlocks the ring gear of the epicyclic gear train.

In different embodiments of applications, the hybrid electric drive system may be configured in any of a front wheel drive vehicle and a rear wheel drive vehicle.

In an embodiment, when implemented for a front wheel application, the epicyclic gear system and mode controller and the electric motor may be mounted as a single module on one side of a transaxle unit of the vehicle.

In an embodiment, when implemented for a rear wheel drive application, the epicyclic gear system and mode controller, the electric motor and the input and output propeller shafts may be mounted as a single module between the IC power pack and the rear axle differential to form a modular "e-propeller" unit.

In an embodiment, when implemented for a rear wheel drive application, the epicyclic gear system and mode controller, the electric motor, the input and output propeller shafts and the rear axle with differential may be mounted as a single module between the IC power pack and the rear wheels of the vehicle to form a modular "hybrid e-axle".

In an embodiment, the hybrid electric drive system may include a cam and solenoid based control mechanism having a pair of solenoids or any other such electromechanical devices operatively coupled to the first and the second levers to move the levers to different positions, based on signals to enable different driving modes.

In an embodiment, the hybrid electric drive system may include a programmable logic operatively coupled to the pair of solenoids or any other such electromechanical devices to provide signals to actuate the pair of solenoids, thereby enabling change of the driving modes from a driver's seat of the vehicle.

In an embodiment, the hybrid electric drive system may include a mechanical cable operated assembly coupled to the first and the second levers to move the levers to different positions, to enable different driving modes.

In an embodiment, for combined mode, the first and second levers may move to a position so that the planet carrier of the epicyclic gear train is unlocked, power from the electric motor is transmitted to the planet carrier, and the ring gear is unlocked such that unlocking of the ring gear allows the sun gear to adjust to the power being transmitted from both IC power pack and electric motor.

In an embodiment, the hybrid electric drive system may further enable a regeneration mode that allows a transfer of power from sun gear to planet carrier with the ring gear locked or unlocked, thereby resulting in different levels of regeneration to allow a battery pack to be recharged, depending on the state of charge.

An aspect of the present disclosure relates to a vehicle that comprises a hydrogen fuel cells stack providing electrical energy to operate the electric motor, wherein the hydrogen fuel cells stack, along with a liquid hydrogen tank and a battery pack is mounted on a chassis of the vehicle.

In an embodiment, electrical energy to operate the electric motor may be provided by an arrangement of ultra-capacitors.

An aspect of the present disclosure relates to a vehicle that is fitted with the proposed hybrid electric drive system.

An aspect of the present disclosure relates to a vehicle that includes a transfer case with a four-wheel drive or all-wheel drive option comprising the disclosed hybrid electric drive system.

An aspect of the present disclosure relates to a vehicle that includes an AI (Artificial Intelligence) based control system. Such a control system on the basis of the road conditions, traffic conditions, vehicular emission restrictions and route selected by the driver, aids the driver by selecting an appropriate driving mode-whether Electric Mode, IC engine mode or combined mode and their combinations thereby ensuring to propel the vehicle by using the best efficiency operating zones of either of the powertrains.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

DETAILED DESCRIPTION

Figure 1A:
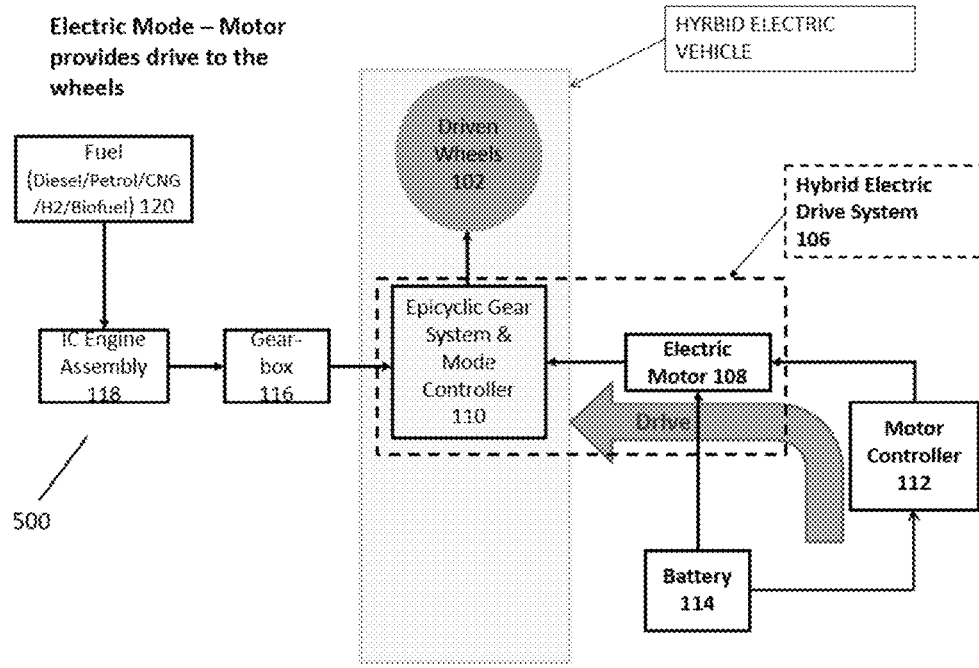
FIG. 1A illustrates an implementation of an electric mode in a vehicle, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Systems depicted in some of the figures may be provided in various configurations. In some embodiments, the systems may be configured as a distributed system where one or more components of the system are distributed across one or more networks in a cloud computing system.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims.

Various terms as used herein are shown below. To the extent a term used in a claim is not defined below, it should be given the broadest definition persons in the pertinent art have given that term as reflected in printed publications and issued patents at the time of filing.

Present invention relates to an alternative powertrain technology that optimises integration of two independent drives such as IC engine based power pack and Electric powertrains, on a vehicle. More particularly, the present invention relates to a vehicle that offers a range of hybrid powertrain solutions, such as ICE & Electric Plug-In Hybrids (PHEV), ICE & Fuel Cell Electric Hybrids (FC-HEV), and other permutation combination of powertrains. The fuel-agnostic nature of this invention offers optimum sustainable mobility solutions for all category of vehicles.

According to an aspect of the present disclosure, a hybrid electric drive system is provided, which can comprise an electric motor and an epicyclic gear system and mode controller. The vehicle can be a front wheel drive vehicle having an internal combustion (IC) engine assembly with a transaxle unit consisting of gearbox (IC engine and gearbox together referred to as IC power pack herein) and a front axle differential. The hybrid electric drive system can be configured within the transaxle unit or by mounting on one side of the transaxle unit between the IC engine gearbox and a front axle differential. When being implemented on a rear wheel drive vehicle, the hybrid electric drive system can be mounted on a chassis of the vehicle between the IC power pack and a rear axle of the vehicle.

Further, the hybrid electric drive system can allow different modes of operations, such as allowing drive from any of the two powertrains, i.e., the IC power pack (IC engine mode) or the electric motor (electric mode) of the hybrid electric drive system, to be transmitted to the corresponding axle of the vehicle, or adding the drive from the two powertrains and seamlessly transmitting the added power to the corresponding axle (combined mode). The power from any or both power trains, i.e., IC power pack and the electric motor can be transmitted to a differential of the corresponding axle.

According to an aspect of the present disclosure, an epicyclic gear system and mode controller of the hybrid electric drive system can allow electric drive from the electric motor to be transmitted to the driven wheels by using the common drive shaft that transmits IC engine power to the differential of the driven axle.

According to an aspect of the present disclosure, an epicyclic gear train of the epicyclic gear system and mode controller can allow output to be taken from sun gear and input to be given to at least one, either a planet carrier or a ring gear. The power from both the IC engine and the electric motor is transmitted to the sun gear, which transmits the power to the common drive shaft.

According to an aspect of the present disclosure, an epicyclic gear train of the epicyclic gear system and mode controller can allow output to be taken and input to be given to a combination of elements among that of the sun gear, planet carrier and ring gear.

According to an aspect of the present disclosure, when implemented on front wheel drive vehicles, the hybrid electric drive system comprising the epicyclic gear system & mode controller, and the electric motor, can be located as a single module within the transaxle unit between the gear box of the IC power pack and the front axle differential thereby forming a modular hybrid electric transaxle drive unit. In front wheel drive vehicles, the gearbox and the final drive along with the differential gear is contained in a single unit called the transaxle drive unit. Hence the space available for mounting a hybrid electric drive unit is highly constrained in front wheel drive vehicles. A modularized hybrid electric system that can be incorporated within the transaxle drive unit can clearly overcome the space constraint, thereby allowing various types of front wheel drive architecture vehicles to be easily and quickly transformed into hybrid electric vehicles.

According to an aspect of the present disclosure, alternatively the hybrid electric drive system comprising the epicyclic gear system & mode controller and the electric motor, can be located as a single module mounted on one side of the transaxle unit between the IC engine gearbox and the front axle differential using mountings.

According to an aspect of the present disclosure, when implemented for rear wheel drive vehicles, the hybrid electric drive system comprising the epicyclic gear system & mode controller, the electric motor and the input and output propeller shafts may be mounted as a single module between the IC power pack and the rear axle differential thereby forming a modular "e-propeller" drive unit.

According to an aspect of the present disclosure, when implemented for rear wheel drive vehicles, the hybrid electric drive system comprising the epicyclic gear system and mode controller, the electric motor, the input and output propeller shafts and the rear axle with differential may be mounted as a single module between the IC power pack and the rear wheels of the vehicle thereby forming a modular "hybrid e-axle" drive unit.

According to an aspect of the present disclosure, the epicyclic gear system & mode controller of the hybrid electric drive system includes a pair of levers that move to different positions to enable different driving modes. The hybrid electric drive system can further have a mechanical cable operated assembly to move the pair of levers to different positions to enable different driving modes.

According to an alternate embodiment of the present disclosure, the hybrid electric drive system can include a cam and solenoid based control mechanism to move the pair of levers to different positions, based on signals, to enable different driving modes.

According to an aspect of the present disclosure, the cam and solenoid based control mechanism may include a mode shifter mounted on a mode shift axle; a pair of eccentric cam bushes mounted on the mode shift axle; and a pair of solenoids coupled to the mode shifter to operate the mode shifter. The pair of levers may be mounted on the eccentric cam bushes such that when the solenoids or any other such electromechanical devices are actuated, the resultant rotation of the mode shift axle causes the levers to move to different positions to enable different driving modes.

According to an aspect of the present disclosure, the control mechanism may further include a programmable logic operatively coupled to the pair of solenoids to provide the signals to actuate the pair of solenoids, thereby enabling change of the driving modes from a driver's seat of the vehicle.

According to an aspect of the present disclosure, the hybrid electric drive system can comprise a first pinion gear, a second pinion gear, and a third pinion gear. The first pinion gear can lock and unlock the planet carrier, the second pinion gear can transmit motor power to ring gear. Further, the third pinion gear can lock and unlock the ring gear, where the first, second, and third pinion gears are mounted on levers that move in different positions to enable three different driving modes.

According to an aspect of the present disclosure, an electric or IC engine mode can be implemented when the levers are moved in a position so that the planet carrier can be unlocked. Further, the electric motor power can be transmitted to the planet carrier through a series of pinion gears, and the ring gear can be locked by pinion such that electric motor power can be transmitted to the sun gear and then onto the common drive shaft. Depending on the switch being on, the electric mode or IC engine mode respectively can be enabled thereby having the first gear ratio for electric motor power transmission or the IC engine power transmission.

According to an aspect of the present disclosure, the electric or IC engine modes can be implemented when the levers are moved in a position so that the ring gear is unlocked. Further, the electric motor power can be transmitted to the ring gear through a series of pinion gears, and the planet carrier can be locked by pinion such that electric motor drive can be transmitted to the sun gear and then onto the common drive shaft thereby having a second gear ratio for electric motor power transmission. Such a system described in the invention herein allows the user and/or the vehicle to select between two possible torque-speed combinations based on the load requirements of the vehicle. It thus provides the ability to optimize the electric drive output based on efficiency and torque optimization. In a similar way multiple ratio torque-speed combinations are possible by including multiple epicyclic gear trains in the hybrid electric drive system.

According to an aspect of the present disclosure, a combined mode can be implemented when the lever is moved in a position so that the planet carrier is unlocked. Further, the power from the electric motor can be transmitted to the planet carrier, and the ring gear can be unlocked such that unlocking of the ring gear allows the sun gear to adjust to the power being transmitted from both of the IC Engine and the electric motor.

According to an aspect of the present disclosure, the locking and unlocking of the ring gear of the epicyclic gear system can be done using a band brake system. The band brake system is operated using a bell crank lever that moves in the desired location to lock or unlock the ring gear based on the position of the control levers of the hybrid electric drive system. The band brake system and the locking pinion can be used in conjunction or individually to get the desired locking and unlocking of the ring gear to enable the different driving modes.

According to an aspect of the present disclosure, the disclosed hybrid electric drive system also enables a regeneration mode during which, mechanical power can be transferred from sun gear to planet carrier with the ring gear locked or unlocked results in different levels of regeneration to allow the battery pack to be recharged depending on the state of charge of the battery.

According to an aspect of the present disclosure, the vehicle can comprise an optional fueling system of hydrogen fuel cells stack providing the electrical energy to operate the electric motor. The hydrogen fuel cells stack, the liquid hydrogen tank and the battery pack of the vehicle can be mounted on chassis of the vehicle at a customizable, appropriate and convenient location.

According to an aspect of the present disclosure, the electrical energy to operate the electric motor can be provided by an arrangement of ultra-capacitors thereby providing one more option for fueling system for the electric powertrain.

According to an aspect of the present disclosure, a power take-off (PTO) option can be provided from the electric powertrain of a hybrid electric vehicle allowing utility trucks, commercial vehicles and tractors to use the PTO option to derive auxiliary power to operate accessories like mowers, water pumps, compressors, etc. Using the present invention such a PTO option can be used even while keeping the IC engine shut off, thereby having zero tailpipe emissions while being in the residential areas, urban areas, city centres or enclosed spaces.

According to an aspect of the present disclosure, an AI (Artificial Intelligence) based control system can be implemented along with the hybrid electric drive. Such a control system on the basis of the road conditions, traffic conditions, vehicular emission restrictions and route selected by the driver, would aid the driver by selecting an appropriate driving mode-whether Electric Mode, IC engine mode or combined mode and their combinations thereby ensuring to propel the vehicle by using the best efficiency operating zones of either of the powertrains.

FIG. 1A illustrates an implementation of the disclosed hybrid electric drive system on a vehicle showing operation in an electric mode, in accordance with an embodiment of the present disclosure.

According to an embodiment, a hybrid electric drive system 106 is implemented in a vehicle 100. The hybrid electric drive system 106 (also interchangeably referred as hybrid electric drive train) includes an electric motor 108 and an epicyclic gear system and mode controller 110. The vehicle 100 includes an IC power pack 500 having an internal combustion (IC) engine assembly 118 and a gearbox assembly, supplying power to wheels 102 of an axle of the vehicle. The vehicle further includes a battery 114 to supply electric power to the electric motor 108, a motor controller 112 and a fuel unit 120 to supply fuel to the IC engine 118.

In an embodiment, the hybrid electric drive system 106 includes an epicyclic (also interchangeably known as "planetary") gear train, which facilitates in utilizing the torque generated from both the electric motor 108 and the IC engine assembly 118 either independently or in a combined way. The hybrid electric drive system 106 provides seamless synchronization of the IC engine drive and the electric drive by taking it from the IC power pack 500 and the electric motor 108. Further, the added or individual drives are transmitted to the common drive shaft 236 (refer to FIG. 2A) of the vehicle 100 and from there on to the final driven axle. The technical specification of the electric drive that includes the electric motor 108 capacity, the related gear ratios of the epicyclic gear system 110 and the battery capacity can be customized as per the vehicle requirements and the user's preferences.

Figure 1B:
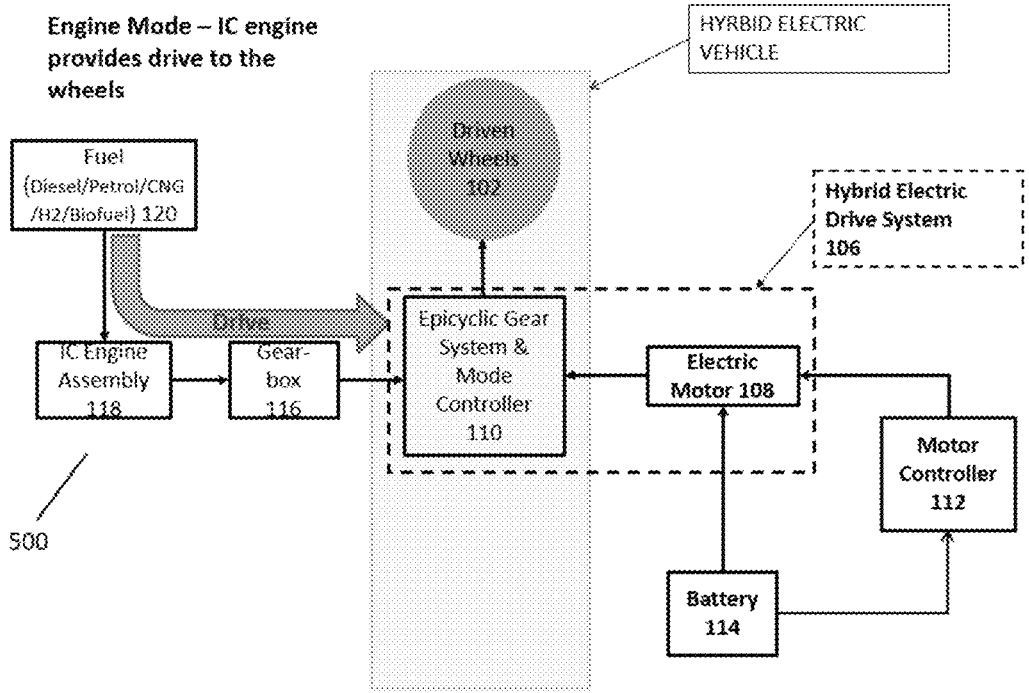
FIG. 1B illustrates an implementation of an engine mode in the vehicle, in accordance with an embodiment of the present disclosure.

In an embodiment, FIG. 1B illustrates an implementation of the disclosed hybrid electric drive system on a vehicle showing operation in an IC engine mode, where the IC engine assembly 118 of the IC power pack 500 provides the drive to the axle through the epicyclic gear train of the epicyclic gear system and mode controller 110.

Figure 1C:
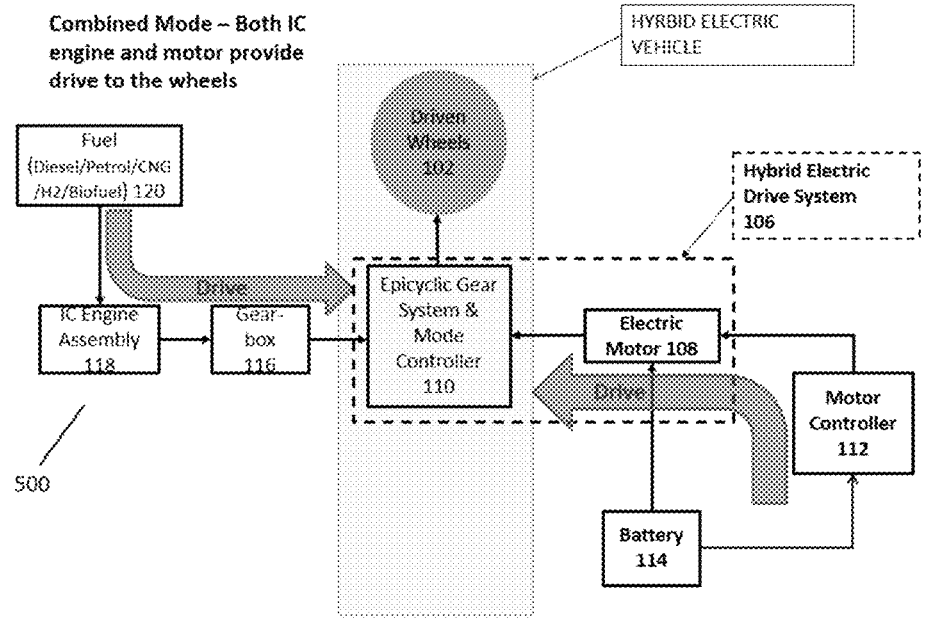
FIG. 1C illustrates an implementation of a combined mode in the vehicle, in accordance with an embodiment of the present disclosure.

In an embodiment, FIG. 1C illustrates an implementation of the disclosed hybrid electric drive system on a vehicle showing operation in combined mode, where both the electric motor 108 and the IC engine assembly 118 provide drive to the axle.

Figure 1D:
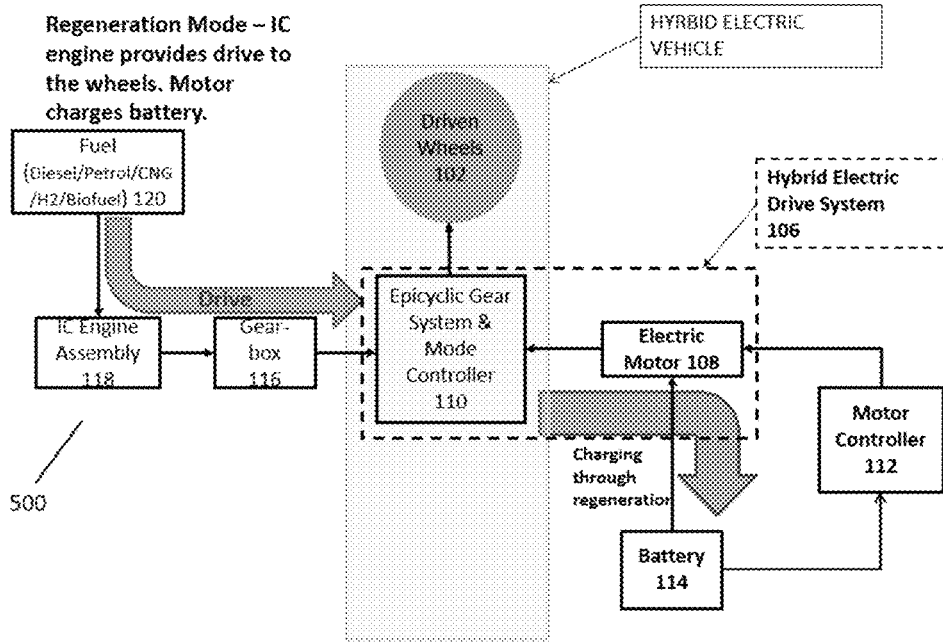
FIG. 1D illustrates an implementation of a regeneration mode in the vehicle, in accordance with an embodiment of the present disclosure.

In an embodiment, FIG. 1D illustrates an implementation of the disclosed hybrid electric drive system on a vehicle showing operation in a regeneration mode, where the electric motor 108 acts as a generator and charges the battery 114, while the vehicle 100 may be driven by the IC engine assembly 118. Even during braking, the electric motor 108 can act as a generator and recharge the battery 114.

In another embodiment, the present invention includes an energy recuperation system that makes innovative use of mechanical power transfer from different elements of the hybrid electric drive system 106 to result in varying levels of regeneration current being fed back into the battery 114 when the vehicle 100 is decelerating or there is a need to apply brakes.

In an embodiment, the hybrid electric drive system 106 is based on the fact, that the existing internal combustion engine drive train IC engine gearbox 116 is kept unaltered till IC engine assembly 118. Further, the hybrid electric drive system 106 which includes the electric motor 108 and the epicyclic gear train in conjunction with a mode controller, when implemented for a front axle, can be added between the gearbox 116 of the IC power pack 500 and a front axle differential final drive 238. The hybrid electric drive system can be configured within a transaxle unit or by mounting on one side of the transaxle unit between the IC engine gearbox 116 and a front axle differential. Both the IC engine assembly 118 and electric drive power is transmitted by a common drive shaft to the front axle differential and then to the front wheels.

In implementation on rear axle, the hybrid electric drive system 106 can be mounted on chassis of the vehicle between the output of the gearbox 116 of the IC power pack 500 and the differential of the rear axle.

Figure 2A:
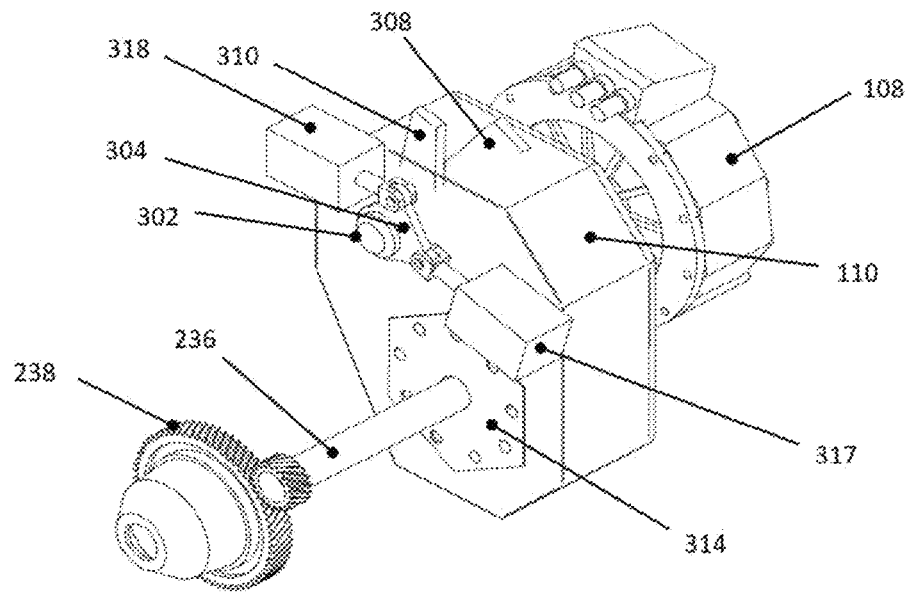
FIG. 2A illustrates an exemplary architecture of Electric Drive Assembly in the vehicle, in accordance with an embodiment of the present disclosure.
Figure 2B:
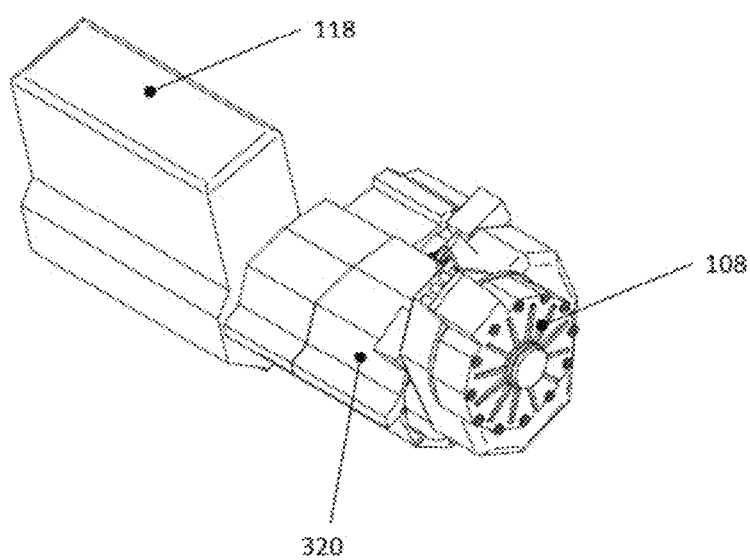
FIG. 2B illustrates an exemplary architecture of Electric Drive Assembly in the vehicle in the form of a modular hybrid electric transaxle drive unit, in accordance with an embodiment of the present disclosure.

FIGS. 2A and 2B illustrate an exemplary representation of architecture of the hybrid electric drive system, in accordance with an embodiment of the present disclosure.

In an embodiment, the major parts of the hybrid electric drive system 106 include the electric motor 108, epicyclic gear system and mode controller 110, the mode controller mechanism consisting of a mode shift axel 302, a mode shifter 304, a mode shifter cable connector 306, a first mode controller lever 308, and a second mode controller lever 310 and a mode shifter cable connector 316, a common final drive shaft 236, a EV drive assembly mounting 314, combined electro-mechanical accelerator control 220, the motor controller (interchangeably known as controller unit) 112 and a single hybrid electric transaxle drive unit 318 (when implemented on a front wheel drive vehicle). Alternatively, the mode controller mechanism can consist of a mode shift axel 302, a mode shifter 304, solenoids 317 & 318, a first mode controller lever 308 and a second mode controller lever 310. The epicyclic gear system and mode controller 110 and the electric motor 108 can be located as a single module mounted on one side of the transaxle unit between the IC engine gearbox and the front axle differential using mountings 314 for front wheel drive vehicles. And for rear wheel drive vehicles the epicyclic gear system and mode controller 110 and the electric motor 108 can be located on the chassis frame of the vehicle using mountings 314 between the output of the gearbox 116 of the IC power pack 500 and the differential of the rear axle. Alternatively, the epicyclic gear system and mode controller 110 and the electric motor 108 can be located as a single module within the transaxle unit between the gearbox and the front axle differential thereby forming a modular hybrid electric transaxle drive unit 320 for implementation in front wheel drive vehicles.

In an embodiment, the electric power is derived from the battery 114, or the hydrogen fuel cell stack mounted on the chassis frame of the vehicle 100 under the passenger or cargo compartment. Thereby, the new additions are maintained within the bodyline of the vehicle 100 and preserving the centre of gravity of the vehicle 100 as low to the ground as possible for better dynamic behaviour and balancing. The charging point 204 is located at a very convenient and easily accessible point on the vehicle 100 and charging is done by an external 15A charger. A three-phase charging adapter is also provided to aid in the fast charging of the vehicle 100.

In an embodiment, the hybrid electric drive system 106 can include a specially fabricated housing within which the electric motor 108 and the epicyclic gear system and mode controller 110 can be placed as a module on one side of the transaxle unit of the vehicle 100, as in case of a front wheel drive vehicles, using special mountings 314 in such a way that the output shaft of the gearbox 116 and the output shaft from the hybrid electric drive system 106 housing are co-axial. The final drive shaft 236 that emerges from the gearbox 116 can be modified and increased in length. By extending the final drive shaft, the sun gear 404 of the epicyclic gear system is connected to the IC engine drive. The power from both IC engine and the electric drive can be transmitted by the final drive shaft 236 to the front wheels 102 through a differential gear 238.

In an embodiment, FIG. 2B shows the modular hybrid electric transaxle drive unit 320. The hybrid electric drive system 106 consisting of the electric motor 108 and the epicyclic gear system and mode controller 110 is located within the transaxle unit 320 of the vehicle in such a way that the output shaft of the IC engine gearbox 116 and the output shaft from the hybrid electric drive assembly 106 are co-axial. The final drive shaft 236 that emerges from the gearbox 116 is modified and increased in length. By extending this final drive shaft, the sun gear 404 of the epicyclic gear system is connected to the IC engine drive. Placement of the epicyclic gear system and mode controller 110 and the electric motor 108 within the transaxle drive unit, helps to form a modular hybrid electric transaxle drive unit 320. The power from both IC engine and the electric drive can be transmitted by the final drive shaft 236 to the front wheels 102 through a differential gear 238.

In an embodiment, the mode selector 214 includes the first lever 308, and the second lever 310, levers 308 and 310 are attached to the mode shift axel 302 through eccentric cam bushes 423 and 424 respectively. The solenoid valves 317 and 318 operate the mode shifter 304 that has eccentric cam bushes 423 and 424 connected to it. The movement of the mode shifter 304 is thereby transmitted to the control levers 308 and 310. The levers 308 and 310 lock and unlock the elements of the epicyclic gear system. Alternatively, a mechanical cable operated assembly can operate the mode shifter 304.

Figure 3A:
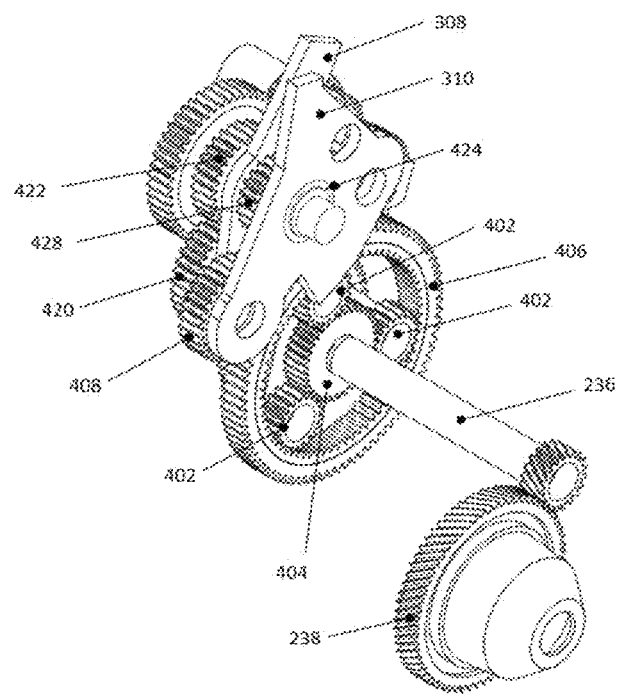
FIG. 3A illustrates the epicyclic gear system from engine side, in accordance with an embodiment of the present disclosure.
Figure 3B:
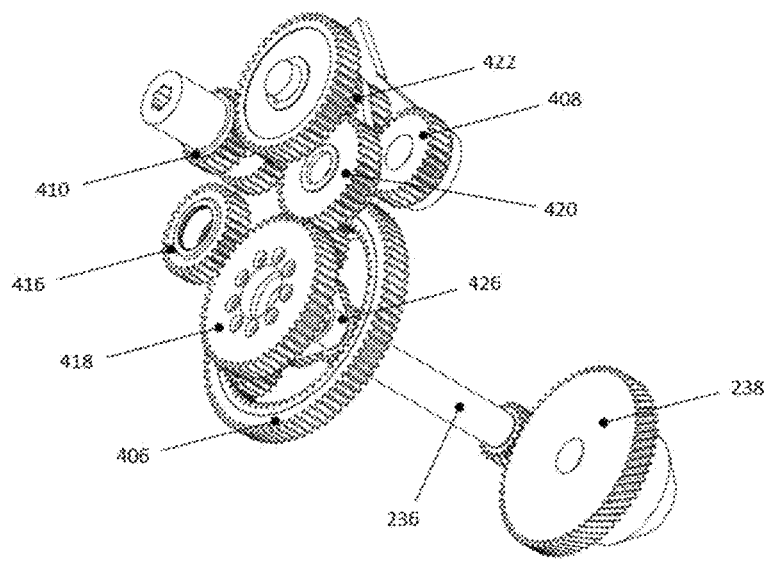
FIG. 3B illustrates the epicyclic gear system from motor side, in accordance with an embodiment of the present disclosure.
Figure 3C:
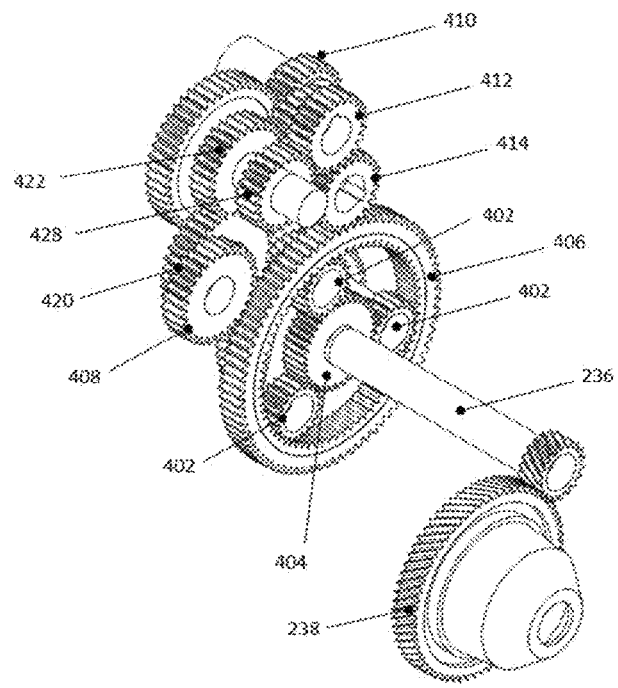
FIG. 3C illustrates the epicyclic gear system from engine side where the control levers are hidden for better understanding, to clearly show the arrangement of pinion gears, in accordance with an embodiment of the present disclosure.

FIGS. 3A and 3C illustrate the epicyclic gear train of the epicyclic gear system and mode controller 110 from the engine side, in accordance with an embodiment of the present disclosure.

FIG. 3B illustrates the epicyclic gear train for FIGS. 3A and 3C from the electric motor side, in accordance with an embodiment of the present disclosure.

Figure 3D:
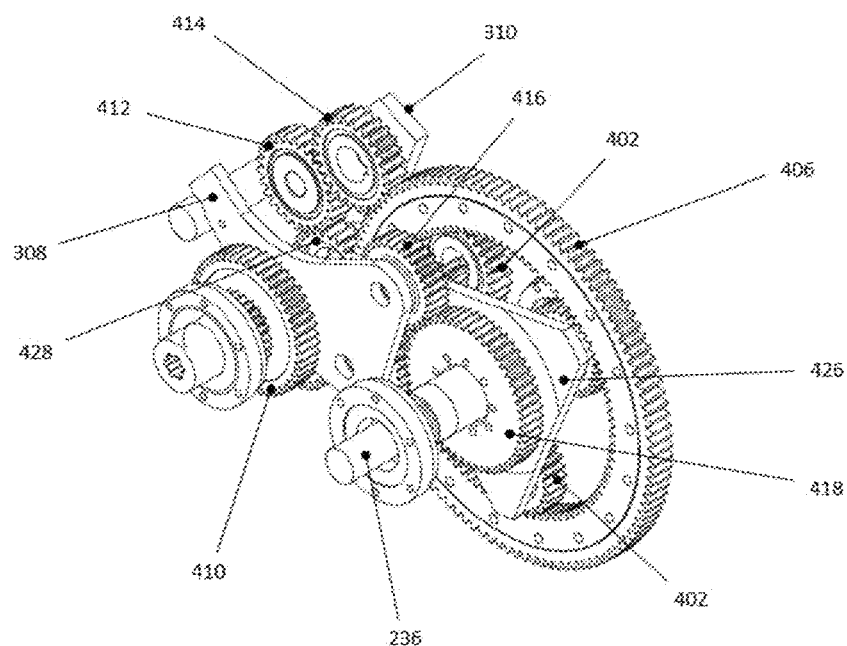
FIG. 3D illustrates the epicyclic gear system from motor side, in accordance with an embodiment of the present disclosure for a rear wheel drive vehicle application.
Figure 3E:
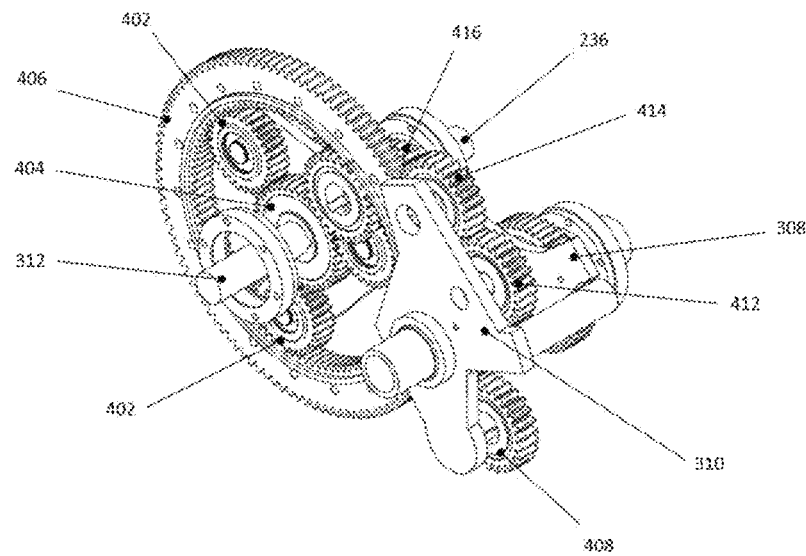
FIG. 3E illustrates the epicyclic gear system from engine side, in accordance with an embodiment of the present disclosure for a rear wheel drive vehicle application.

FIGS. 3D and 3E illustrate the epicyclic gear train of the epicyclic gear system and mode controller 110 from the electric motor side and engine side respectively when used in rear wheel drive vehicles, in accordance with an embodiment of the present disclosure.

In an embodiment, the epicyclic gear system and mode controller 110 is used in the hybrid electric drive system 106. The epicyclic gear train of the epicyclic gear system and mode controller 110 consists of a set of planet gears 402, a sun gear 404, a ring gear 406. The electric motor shaft is connected to pinion 410, which then transmits the electric motor power to the epicyclic gear train through series of pinion gears. Further, the epicyclic gear train in conjunction with mode selector 214 includes common final drive shaft differential side 236, a set of locking gears 408 and 416, a set of pinion gears 418, 420 and 422 for transmitting electric motor power to planet carrier, a set of pinion gears 412, 414 and 428 for transmitting electric motor power to ring gear 406, the first lever 308, and the second lever 310.

In an embodiment, FIGS. 3A, 3B and 3C represent the epicyclic gear train used in the hybrid electric drive system 106 for a front wheel drive vehicle application. The epicyclic gear train consists of the planet gears 402, the sun gear 404, the ring gear 406, and the planet carrier 426. Unlike other epicyclic gearboxes used in automotive applications, here the output torque is taken from the sun gear 404 and the input torque is provided to the planet carrier 426, or the ring gear 406. The sun gear 404 receives the electric drive torque from the electric motor shaft through the planet gears 402 or the ring gear 406. Also, the sun gear 404 receives the IC engine torque from output shaft 236 of the gear box of the IC engine power pack 500. In case of front wheel drive vehicles this final drive shaft 236 that emerges from the IC engine gearbox 116 is modified and increased in length. By extending this final drive shaft, the sun gear 404 of the epicyclic gear train is connected to the IC power pack 500.

In an embodiment, FIGS. 3D and 3E represent the epicyclic gear train used in the hybrid electric drive system 106 for a rear wheel drive vehicle application. Similar to the front wheel drive application described above the epicyclic gear train consists of the planet gears 402, the sun gear 404, the ring gear 406, and the planet carrier 426. The sun gear 404 receives the electric drive torque from the electric motor shaft through the planet gears 402 or the ring gear 406 thus having two torque-speed ratios. Also, the sun gear 404 receives the IC engine torque from the IC engine assembly 118 and gearbox output shaft. The sun gear 404 transmits the individual or combined torque to the propeller shaft 236.

Figure 3F:
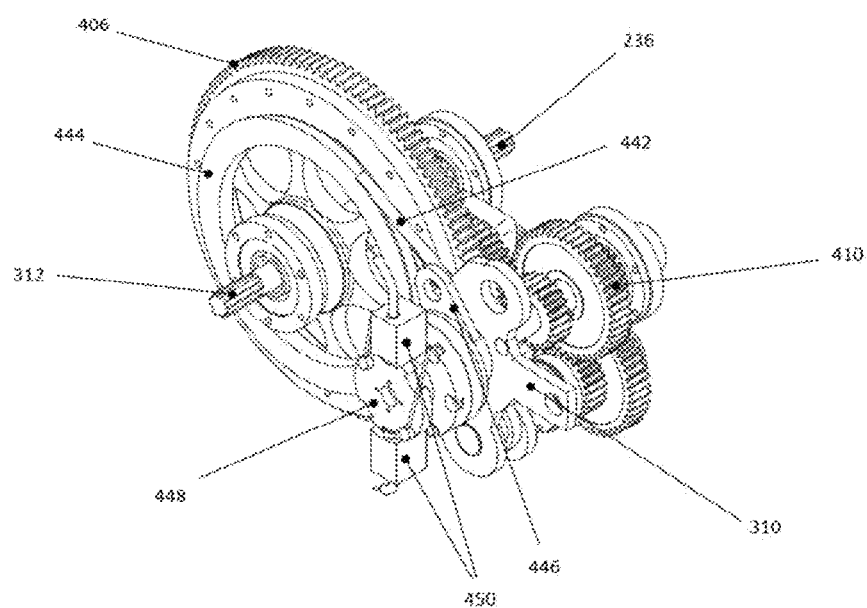
FIG. 3F illustrates the epicyclic gear system from engine side, in accordance with an embodiment of the present disclosure with an alternative arrangement for locking and unlocking of the ring gear of the epicyclic gear train.

In an embodiment, FIG. 3F represents the bandbrake system that can be used as an alternate arrangement for locking and unlocking of the ring gear 406 of the epicyclic gear train. The band brake system consists of the brake band 442 and the hub 444 connected to the ring gear 406. The bell crank lever 446 moves in the desired location to tighten or loosen the band 442 on the hub 444 to lock or unlock the ring gear 406 based upon the required operation to enable the different driving modes. This movement of the bell crank lever 446 is enabled by a spring-loaded plunger locking arrangement 448 operated by a cable system 450. The band brake system and the locking pinion system can be used in conjunction or individually to get the desired locking and unlocking of the ring gear.

Figure 3G:
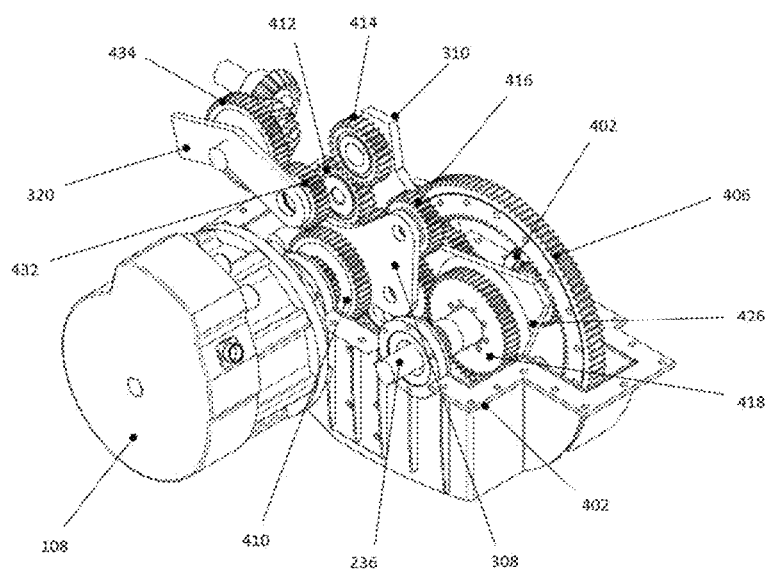
FIG. 3G illustrates the epicyclic gear system from engine side, in accordance with an embodiment of the present disclosure with the two torque-speed ratios for the electric drive and the Power Take-Off mechanism

In an embodiment, FIG. 3G shows the epicyclic gear system in conjunction with the arrangement for the two torque-speed ratio for electric drive and the Power Take-Off (PTO) mechanism. The levers 308 and 310 lock and unlock the elements of the epicyclic gear system. The lever 320 engages and disengages the PTO mechanism from the electric drive using the pinion gear 432 that engages with the motor pinion 410. The electric motor 108 power is transmitted to the hybrid electric drive system by connecting the motor shaft to motor pinion 410. The output shaft of the hybrid electric drive system is connected to the propeller shaft 236. The IC engine assembly 118 drive is transmitted to the hybrid electric drive system by the shaft 312.

Figure 4A:
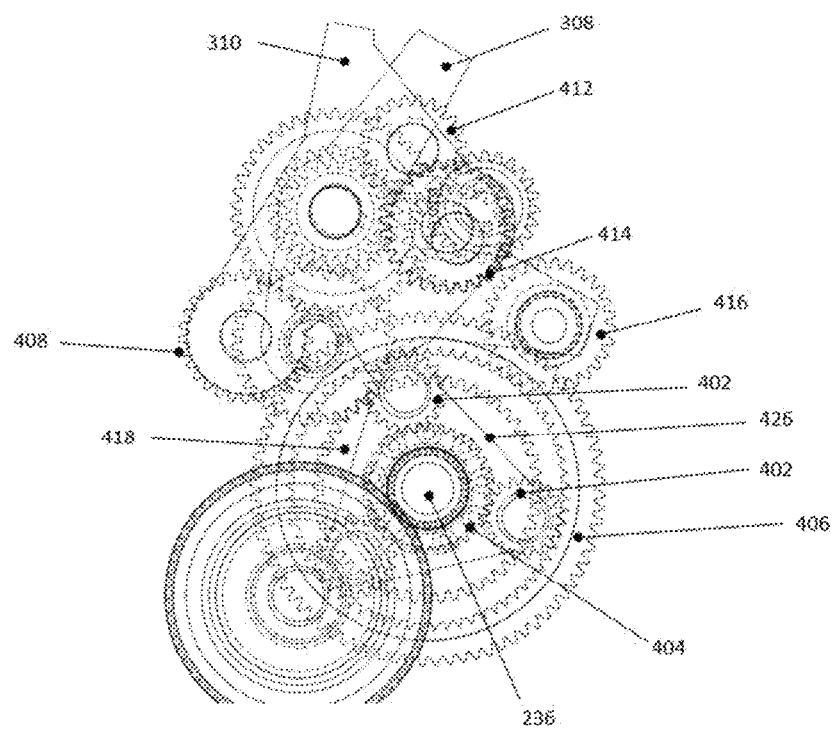
FIGS. 4A and 4D illustrates the mode controller when in single mode, in accordance with an embodiment of the present disclosure.
Figure 4B:
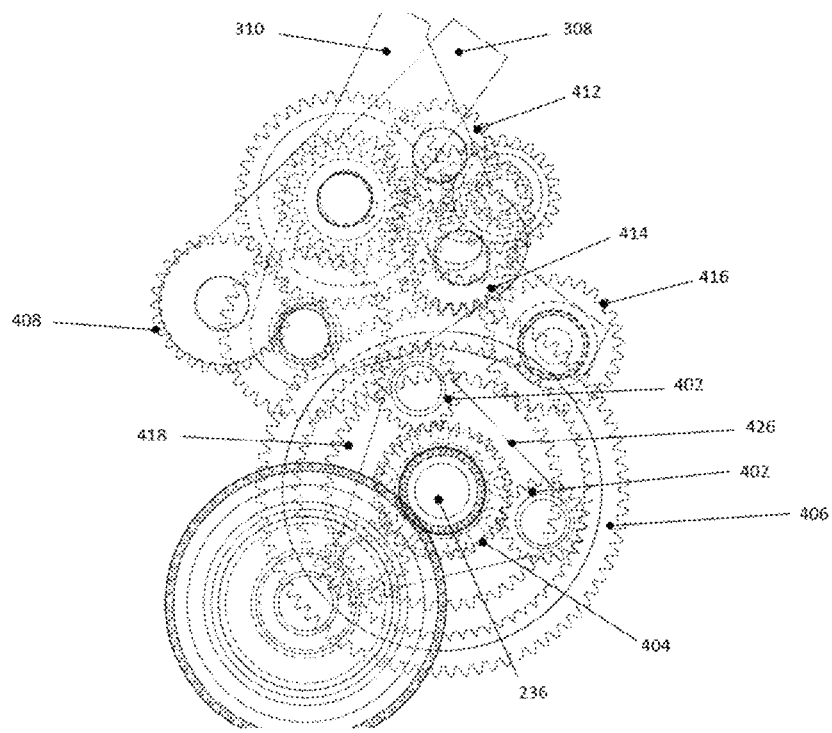
FIGS. 4B and 4E illustrates the mode controller when in second ratio for electric mode, in accordance with an embodiment of the present disclosure.
Figure 4C:
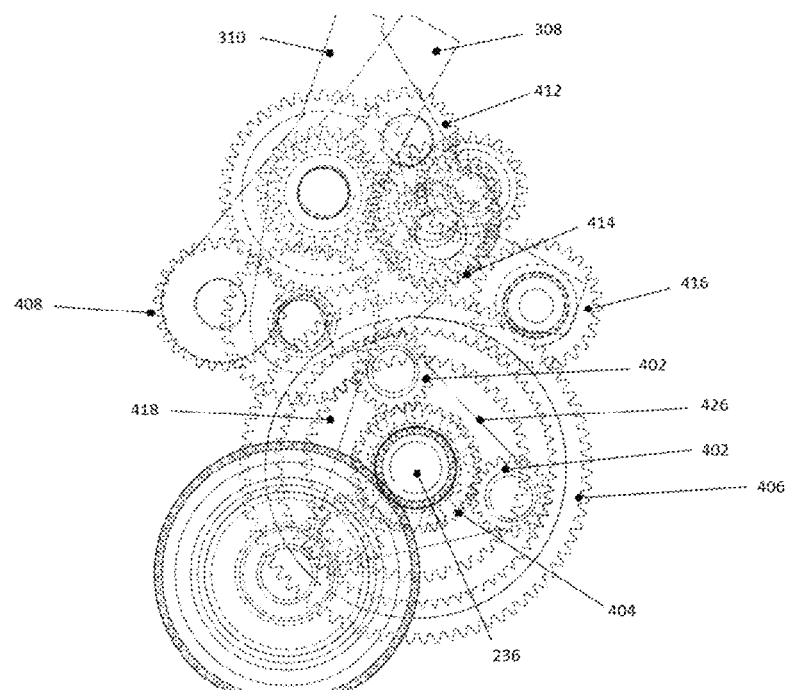
FIGS. 4C and 4F illustrates the mode controller when in combined mode, in accordance with an embodiment of the present disclosure.

FIGS. 4A, 4B, and 4C illustrate the mode controller when in single mode, a second torque-speed gear ratio for electric mode, combined mode respectively, and in accordance with an embodiment of the present disclosure for a front wheel drive vehicle application.

Figure 4D:
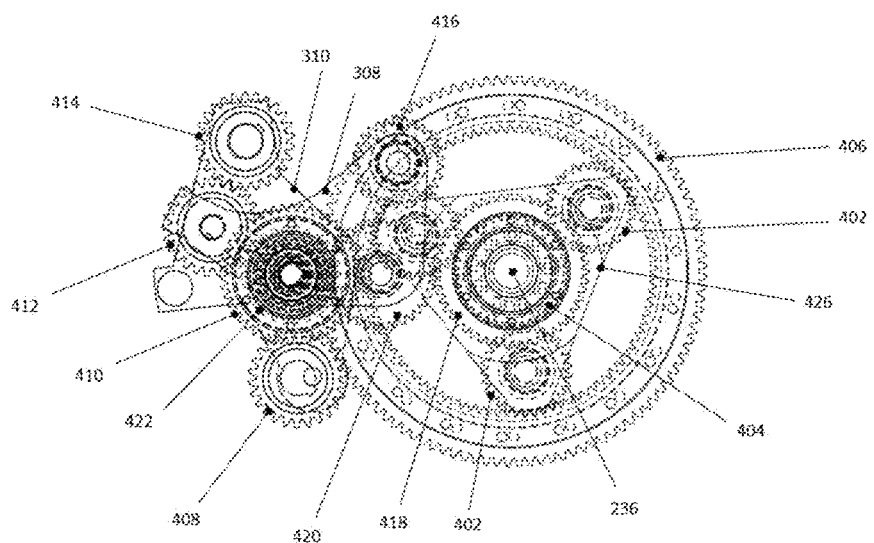
Figure 4E:
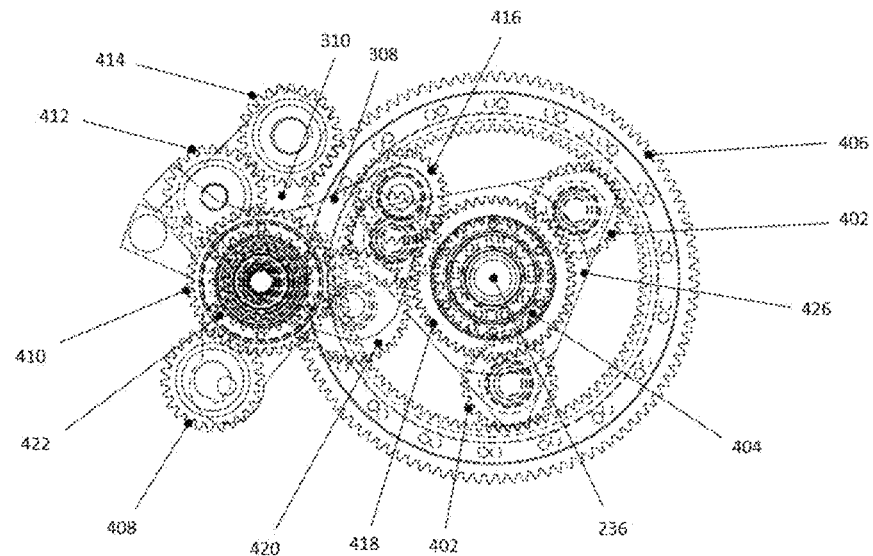
Figure 4F:
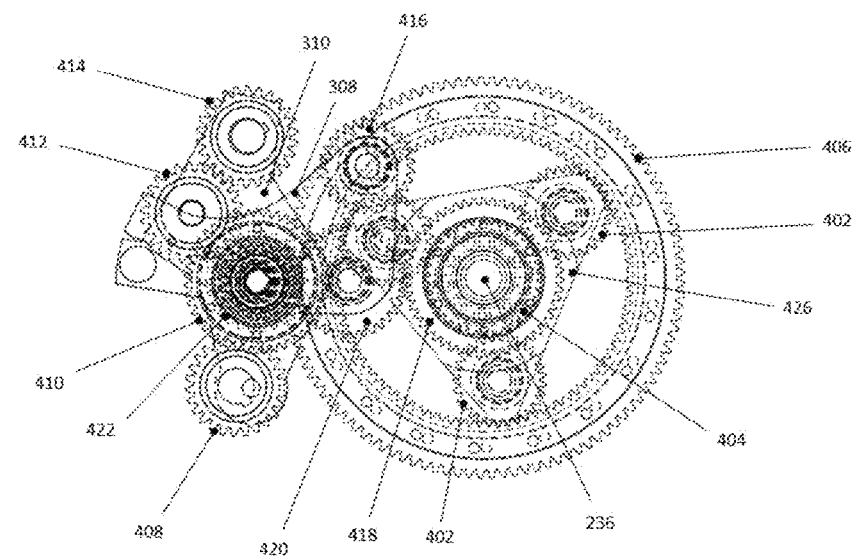

FIGS. 4D, 4E, and 4F illustrate the mode controller when in single mode, a second torque-speed gear ratio for electric mode, combined mode respectively, and in accordance with an embodiment of the present disclosure for a rear wheel drive vehicle application.

In an embodiment, FIGS. 4A and 4D illustrates the epicyclic gear system and mode controller 110 when in a first torque-speed gear ratio during IC engine mode or electric mode, where the ring gear 406 is locked by pinion 408 and the planet carrier 426 is unlocked. Drive from the electric motor 108 is transmitted to the planet carrier 426 of the epicyclic gear train through a set of pinion gears 422, 420 and 418. FIGS. 4B and 4E illustrates the epicyclic gear system and mode controller 110 when in second torque-speed gear ratio during electric mode, where the pinion 416 locks the planet carrier 426 and the ring gear 406 is unlocked. Drive from the electric motor 108 is transmitted to the ring gear 406 of the epicyclic gear train through a set of pinion gears 414, 412 and 428.

FIGS. 4C and 4F illustrates the epicyclic gear system and mode controller 110 in combined mode, where the levers 308 and 310 are moved in a position to enable both the planet carrier 426 and the ring gear 406 to stay unlocked. The torque from the electric motor 108 is transmitted to the planet carrier 426 and then to the sun gear 404. Additionally, the sun gear 404 also receives the IC engine torque from the gearbox output shaft 236. The unlocked ring gear 406 allows the sun gear 404 to adjust to the torque being transmitted by both the electric motor 108 and the IC engine assembly 118 at the same time.

In another exemplary embodiment, the levers 308 and 310 of the epicyclic gear system and mode controller 110 can be operated by a mechanical cable operated system or the cam & solenoid mechanism, to control operation of various modes by locking different elements of the planetary gear train of the epicyclic gear system and mode controller 110. The two control levers 308 and 310 can be moved by the cable mechanism or by the cam & solenoid mechanism to different positions to enable three different modes, i.e., electric mode, IC engine mode, and a combined mode. The locking and unlocking of the planetary gear train elements is done via the two pinion gears 408 and 416. As shown in FIGS. 4A and 4D for the first torque-speed gear ratio during the electric mode or the IC engine mode, the levers 308 and 310 are moved in such a position that the planet carrier 426 is not locked and can receive the power from the electric motor 108. The ring gear 406 is locked in position by the pinion 408. Further, depending on the switch 228 and 230 being in electric mode or engine mode, either of the modes is enabled. For electric mode, the torque from the electric motor 108 is transmitted to the unlocked planet carrier 426 through the pinion gears 410, 422, 420, and 418. This torque is then transmitted to the sun gear 404 for further transmission to the common final drive shaft 236. For engine mode, the torque from the engine is transmitted to the sun gear 404 directly by the output shaft of the gearbox of the IC power pack 500. For the second torque-speed gear ratio in electric mode, the levers 308 and 310 are positioned as shown in FIGS. 4B and 4E. Such positioning of the levers 308 and 310 causes the planet carrier 426 to be locked by the pinion 416 and the ring gear 406 is unlocked and is in mesh with the pinion gear 414. The electric motor torque from the electric motor 108 is transmitted to the unlocked ring gear 406 through the pinion gears 410, 422, 428, 412, and 414. This torque is then transmitted to the sun gear 404 to further transmit it to the common final drive shaft 236 and then onto the wheels 102, 104. For combined mode as shown in FIGS. 4C and 4F, the levers 308 and 310 are moved to a position to enable both the planet carrier 426 and the ring gear 406 to stay unlocked. The torque from the electric motor 108 is transmitted to the planet carrier 426 and then to the sun gear 404. Additionally, the sun gear 404 also receives drive from the IC power pack. The unlocked ring gear 406 allows the sun gear 404 to adjust to the torque being transmitted by both the electric motor 108 and the IC power pack 500, at the same time.

In another embodiment, alternatively the mode controller 110 can be operated electronically using a microcontroller based mechanism that uses solenoid actuators. Here the movement of the two levers 308, 310 can be done electronically instead of the mechanical cable arrangement to enable the three different modes Electric or IC engine mode, combined mode, and reverse in electric mode.

Figure 4G:
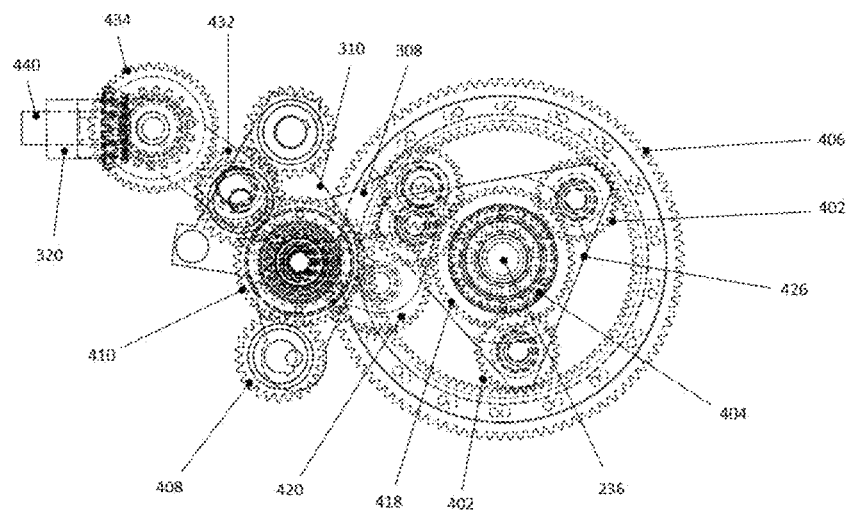
FIGS. 4G and 4H illustrates the Power Take-Off option driven by the electric powertrain in a hybrid electric vehicle.
Figure 4H:
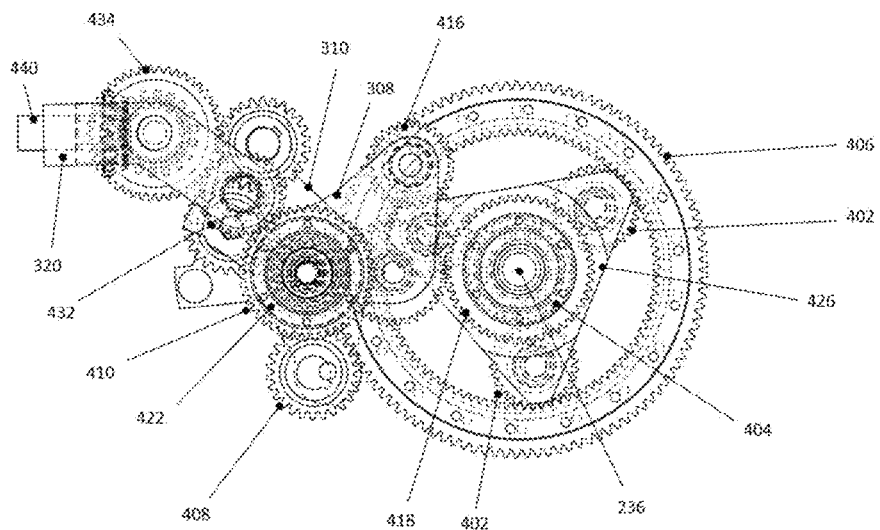

FIGS. 4G and 4H illustrate the hybrid electric drive system with a Power Take-off Option (PTO).

In an embodiment, FIG. 4G illustrates how the Power Take-off option to derive auxiliary power is implemented in the hybrid electric drive system. The electric motor drive 108 is transmitted to the hybrid electric drive system by the motor shaft connected to the pinion 410. The PTO lever 312 is moved in position such that the pinion 432 is in mesh with motor pinion 410. The electric motor drive is thus transmitted through the pinion 432, 434 and the set of bevel gears 436 & 438 to the PTO output shaft 440. The pinion gear 420 is out of mesh with the planet carrier pinion 418. The electric motor drive is thus used to drive the PTO operated accessories while there is no drive transmitted from the electric motor 108 to the epicyclic gear system and hence the propeller shaft 236 and wheels of the vehicle such that the PTO accessories can be operated while the vehicle is stationary or not driven by electric power.

In another embodiment, FIG. 4H illustrates how the Power Take-off option to derive auxiliary power is implemented in the hybrid electric drive system while the vehicle is also driven under electric power through the hybrid electric drive system. The electric motor drive 108 is transmitted to the hybrid electric drive system by the motor shaft connected to the pinion 410. The PTO lever 312 is moved in position such that the pinion 432 is in mesh with motor pinion 410. The electric motor drive is thus transmitted through the pinion 432, 434 and the set of bevel gears 436 & 438 to the PTO output shaft 440. The pinion gear 420 is in mesh with the planet carrier pinion 418. The electric motor drive is thus used to drive the PTO operated accessories while there is electric motor drive being transmitted from the electric motor 108 to the epicyclic gear system and hence the propeller shaft 236 and wheels of the vehicle such that the PTO accessories can be operated while the vehicle is being driven by electric power.

Although this present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope of and the present invention.

Advantages of the Present Disclosure

The present disclosure provides an efficient mechanism to build low emissions, fuel-saving hybrid electric drive system that can operate independently and in combined mode. Such a system would improve the fuel economy significantly and this would also mean a significant reduction in $CO_2$ emissions per km.

The present disclosure provides a hybrid electric drive system that increases the life expectancy of the vehicle.

The present disclosure provides a hybrid electric drive system that provides a cost-effective solution to reduce the emissions from vehicles.

The present disclosure provides a hybrid electric drive system that helps in conserving the usage of fossil fuel thereby helping in reducing the import bills of such fuels for the nation.

The present disclosure provides a hybrid electric drive system which helps to re-purpose/upcycle the existing IC engine driven vehicle architectures into such cost-effective, low emissions, inclusive, consumer friendly mobility solutions; and also reduce the design and manufacturing costs for manufacturers.

Using this invention, OEM's can either manufacture new PHEV or FC-HEV variants of their existing ICE vehicles in the portfolio, or can promote the retrofit conversion solutions through their authorised service/dealer network, both options offering huge additional revenue opportunities, besides leading to substantially higher green miles and achieving better CAFE regulatory norms. On a national level, the resulting savings of imported fossil fuels and the consequential benefits to national economy is certainly a huge advantage.

The present invention can be extremely beneficial for the consumers because it offers them the opportunity to recover substantial initial cost of vehicle due to reduced operating costs over the lifespan of vehicle. Since, the employment will be retained and can be grown further across ICE/EV/FCEV supply chains and multiple fuels eligible to be used, this invention is extremely inclusive for the economy.

Thus, the present invention would be a win-win solution for all the stakeholders such as Government, OEM, Consumers, Economy and Environment that we all have shared interests in.

We claim:

1. A hybrid electric drive system for a vehicle, said hybrid electric drive system comprising: an electric motor; and an epicyclic gear system and mode controller; wherein the hybrid electric drive system is configured between an output of an IC power pack of the vehicle and an axle of the vehicle; wherein the hybrid electric drive system enables three different driving modes, the three driving modes comprising: an IC engine mode with drive to the axle from the IC power pack, an electric mode with drive to the axle from the electric motor, and a combined mode with drive to the axle collectively from the IC power pack and the electric motor; and wherein the epicyclic gear system and mode controller comprises a first lever and a second lever that move to different positions to enable locking or unlocking of at least one of a planet carrier and a ring gear for enabling two different forward torque-speed ratios, comprising a first torque-speed ratio and a second torque-speed ratio, during the electric mode;

wherein the epicyclic gear system and mode controller allows output to be taken from a sun gear of an epicyclic gear train of the epicyclic gear system and mode controller, and input to be given to at least one of a planet carrier or a ring gear of the epicyclic gear train;

wherein the power from both the IC power pack and the electric motor is transmitted to the sun gear such that the sun gear transmits the power to the axle;

wherein the epicyclic gear system and the mode controller comprises a first pinion gear that locks and unlocks the planet carrier, and a third pinion gear that locks and unlocks the ring gear of the epicyclic gear train;

wherein the epicyclic gear system and mode controller comprises a first series of pinion gears that transmits power from the electric motor to the planet carrier of the epicyclic gear system and a second series of pinion gears that transmits power from the electric motor to the ring gear of the epicyclic gear system, wherein the first and second levers move to the different positions to enable three different driving modes; and wherein, for the second torque-speed gear ratio in the electric mode, the first and second levers are moved to a position such that the ring gear of the epicyclic gear train is unlocked, the planet carrier of the epicyclic gear train is locked by the first pinion, and power from the electric motor is transmitted to the ring gear through the second series of pinion gears of the epicyclic gear train.

2. The hybrid electric drive system as claimed in claim 1, wherein said hybrid electric drive system is configured in any of a front wheel drive vehicle and a rear wheel drive vehicle.

3. The hybrid electric drive system as claimed in claim 2, wherein, when implemented for a front wheel application, the epicyclic gear system and mode controller and the electric motor are mounted as a single module on one side of a transaxle unit of the vehicle.

4. The hybrid electric drive system as claimed in claim 1, wherein for the first torque speed gear ratio in the electric mode or the IC engine mode, the first and second levers are moved to a position such that the planet carrier of the epicyclic gear train is unlocked, the electric motor power is transmitted to the planet carrier through a series of pinion gears of the epicyclic gear system and mode controller, and the ring gear is locked by pinion such that, the electric mode or IC engine mode respectively is enabled.

5. The hybrid electric drive system as claimed in claim 1, wherein for combined mode, the first and second levers are moved to a position so that the planet carrier of the epicyclic gear train is unlocked, power from the electric motor is transmitted to the planet carrier, and the ring gear is unlocked such that unlocking of the ring gear allows the sun gear to adjust to the power being transmitted from both IC power pack and electric motor.

6. The hybrid electric drive system as claimed in claim 1, wherein the hybrid electric drive system comprises a cam and solenoid based control mechanism having a pair of solenoids operatively coupled to the first and the second levers to move the levers to different positions, based on signals to enable different driving modes.

7. The hybrid electric drive system as claimed in claim 6, wherein the hybrid electric drive system comprises a software based set of instructions forming a programmable logic operatively coupled to the pair of solenoids to provide signals to actuate the pair of solenoids, thereby enabling change of the driving modes from a driver's seat of the vehicle.

8. The hybrid electric drive system as claimed in claim 1, wherein the hybrid electric drive system comprises a mechanical cable operated assembly that is operatively coupled to the first and the second levers to move the levers to different positions to enable different driving modes.

9. A hybrid electric drive system for a vehicle, said hybrid electric drive system comprising: an electric motor; and an epicyclic gear system and mode controller; wherein the hybrid electric drive system is configured between an output of an IC power pack of the vehicle and an axle of the vehicle; wherein the hybrid electric drive system enables three different driving modes, the three driving modes comprising: an IC engine mode with drive to the axle from the IC power pack, an electric mode with drive to the axle from the electric motor, and a combined mode with drive to the axle collectively from the IC power pack and the electric motor; and wherein the epicyclic gear system and mode controller comprises a first lever and a second lever that move to different positions to enable locking or unlocking of at least one of a planet carrier and a ring gear for enabling two different forward torque-speed ratios, comprising a first torque-speed ratio and a second torque-speed ratio, during the electric mode;

wherein the epicyclic gear system and mode controller allows output to be taken from a sun gear of an epicyclic gear train of the epicyclic gear system and mode controller, and input to be given to at least one of planet carrier or a ring gear of the epicyclic gear train;

wherein the power from both the IC power pack and the electric motor is transmitted to the sun gear such that the sun gear transmits the power to the axle;

wherein the epicyclic gear system and the mode controller comprises a band brake system comprising of the brake band, a hub connected to the ring gear and a bell crank lever, and wherein a spring-loaded plunger locking arrangement operated by a cable system enables the bell crank lever to move in the desired location to tighten or loosen the band on the hub to lock or unlock the ring gear to enable the different driving modes.

10. The hybrid electric drive system as claimed in claim 1, wherein the hybrid electric drive system further enables a regeneration mode that allows a transfer of power from sun gear to planet carrier with the ring gear locked or unlocked, thereby resulting in different levels of regeneration to allow a battery pack to be recharged, depending on the state of charge.

11. The hybrid electric drive system as claimed in claim 1, wherein, by including more than one epicyclic gear train in the 5 hybrid electric drive system, multiple torque speed gear ratios could be made possible in the electric mode.

12. A hybrid electric drive system for a vehicle, said hybrid electric drive system comprising: an electric motor; and an epicyclic gear system and mode controller; wherein the hybrid electric drive system is configured between an output of an IC power pack of the vehicle and an axle of the vehicle; wherein the hybrid electric drive system enables three different driving modes, the three driving modes comprising: an IC engine mode with drive to the axle from the IC power pack, an electric mode with drive to the axle from the electric motor, and a combined mode with drive to the axle collectively from the IC power pack and the electric motor; and wherein the epicyclic gear system and mode controller comprises a first lever and a second lever that move to different positions to enable locking or unlocking of at least one of a planet carrier and a ring gear for enabling two different forward torque-speed ratios, comprising a first torque-speed ratio and a second torque-speed ratio, during the electric mode;

wherein the epicyclic gear system and mode controller allows output to be taken from a sun gear of an epicyclic gear train of the epicyclic gear system and mode controller, and input to be given to at least one of planet carrier or a ring gear of the epicyclic gear train; and wherein to enable a power take-off, a PTO lever is moved in a position such that a PTO pinion gear gets engaged with a motor pinion and an idler pinion gear is taken out of mesh, and wherein the electric motor power is then transmitted to a power take-off output shaft with the electric motor, with power not being transmitted to the epicyclic gear system.

13. The hybrid electric drive system as claimed in claim 1, wherein to enable a power take-off, a PTO lever is moved in a position such that a PTO pinion gear gets engaged with a motor pinion and an idler pinion gear is kept in mesh with pinion gears, and wherein the electric motor power is then transmitted to a power take-off output shaft, with the electric motor power also being transmitted to the epicyclic gear system to allow the vehicle to be driven by the electric motor power.

14. The hybrid electric drive system as claimed in claim 1, wherein electrical energy to operate the electric motor is provided by an energy source, a battery, a hydrogen fuel cells stack, or an arrangement of ultracapacitors.

15. The hybrid electric drive system as claimed in claim 1, wherein electrical energy to operate the electric motor is provided by an arrangement of ultra-capacitors.

16. A vehicle having a transfer case with a four-wheel drive or all-wheel drive option comprising the hybrid electric drive system as claimed in claim 1.

* * * * *